INVENTORS:
William J. Dyke
Paul G. Roberts
BY
ATTORNEYS.

3,541,893
CONTROL VALVE SYSTEM CONTROLLING RATIO
CHANGES IN A MULTIPLE RATIO POWER
TRANSMISSION MECHANISM
William J. Dyke, Northville, and Paul G. Roberts,
Livonia, Mich., assignors to Ford Motor Company,
Dearborn, Mich., a corporation of Delaware
Filed Apr. 2, 1968, Ser. No. 718,069
Int. Cl. B60k 21/00; F16d 47/00
U.S. Cl. 74—864            6 Claims

ABSTRACT OF THE DISCLOSURE

A control valve system for a multiple-ratio, power transmission mechanism in an automotive vehicle driveline including fluid pressure operated servos for controlling the relative motion of transmission gear elements, and a valve system including an engine torque signal source for producing a controlled signal for the control valve which delays the ratio upshift point during acceleration to a degree that is dependent upon the magnitude of the engine torque being delivered through the gearing, wherein the torque signal is modified to cause the upshift point to occur at a torque demand that is substantially different than the torque demand that would occur on a downshift from the higher speed ratio to the lower speed ratio thereby avoiding the occurrence of "hunting" or uncontrolled transitions from one ratio to the other when transient driving conditions are present.

GENERAL DESCRIPTION OF THE INVENTION

In the design of a multiple-ratio power transmission mechanism for use in an automotive vehicle driveline having an internal combustion engine, it is known practice to use the pressure in the engine intake manifold system as a control variable. Changes in the manifold pressure cause a change in a pressure signal in the valve circuit to initiate ratio changes. That signal, in cooperation with a signal that is proportional in magnitude to the driven speed of the power output shaft of the transmission, is used to control the position of a ratio control valve.

When the gearing is capable of establishing a direct-drive, locked-up condition, or when it is capable of establishing an overdrive ratio in addition to the underdrive ratios, the control valve that establishes ratio changes between the highest speed ratio such as the lock-up 1:1 ratio or the overdrive ratio and the adjacent underdrive ratio, receives a torque signal from the torque signal pressure source in the valve system to delay the upshift point.

During acceleration the speed at which the control valve moves from the accelerating underdrive position to the high speed ratio position is determined by the magnitude of the torque signal itself. When the control valve establishes a downshift from its highest speed ratio to the next adjacent ratio, the torque sensitive pressure signal again determines the downshift point.

In certain prior art constructions this downshift point occurs when the engine manifold pressure is very close to the manifold pressure that is required to establish an upshift. During operation in the high speed ratio with transmissions of this type, it is not uncommon to experience variations in engine manifold pressure in an amount equal to six inches of mercury. When the transmission is operating at a speed that is close to the speed at which the upshift occurs, and if the intake manifold pressure should change during a transient condition a substantial amount, a downshift will occur when a downshift is not desired. The engine manifold pressure changes as a result of this downshift, and the transmission then will immediately assume the upshift condition. Uncontrolled hunting between the upshift and downshift ratios during this transient operating range then may result.

According to a principal feature of our invention, we have made provision for distinguishing more clearly the downshift point for the high speed ratio from the upshift point for the next adjacent underdrive ratio. We do this by incorporating into the valve system a primary throttle pressure reducer valve and a secondary throttle pressure reducer valve, both of which are in fluid communication with the ratio control valve. The primary throttle pressure reducer valve receives pressure from the torque sensitive pressure source and modifies it to establish the desired upshift point during acceleration as a ratio change from the underdrive ratio to the high speed ratio occurs. During operation in the high speed ratio, the secondary throttle reducer valve influences the effective torque signal which acts on the control valve thereby separating the downshift point from the upshift point.

PARTICULAR DESCRIPTION OF THE INVENTION

Figure 1:
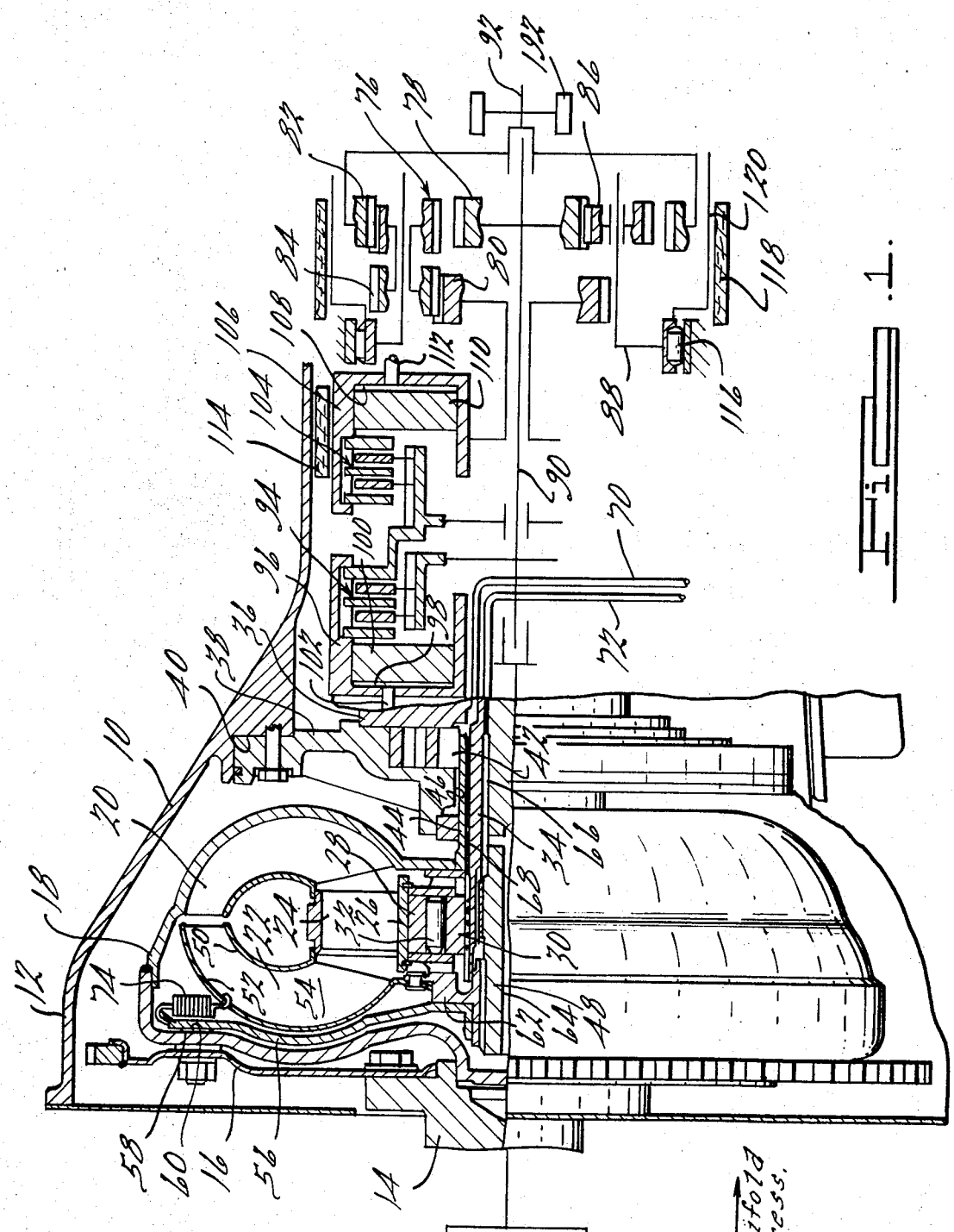
FIG. 1 shows in schematic, cross-sectional form a gearing arrangement capable of embodying the improved control system of my invention.

In FIG. 1 numeral 10 designates a transmission housing. It includes a flanged converter housing 12 which may be bolted to the engine block of an internal combustion engine, not shown. The engine comprises a crankshaft 14, which is connected drivably to a drive plate 16, the outer periphery of which is bolted to an impeller shell 18. This shell comprises two parts, one of which forms an impeller housing or shroud in which is positioned the blades of a bladed impeller 20. Shell 18 forms a closed cavity within which is situated a bladed turbine 22 located in toroidal fluid-flow relationship with respect to the impeller 20.

A bladed stator 24 is situated between the flow exit region of the turbine 22 and the flow entrance region of the impeller 20. It comprises a stator hub 26 having a central opening in which is received the outer race 28 of an overrunning brake. The brake includes, in addition to the race 30, brake rollers 32 which cooperate with cam surfaces formed on the race 28 thereby establishing a one-way braking action between the races. The inner race 30 is splined to a stationary sleeve shaft 34 which is fixed at its right-hand end to a flange portion 36 bolted to a forward wall 38 located within the housing 10. Wall 38 which is secured to shoulder 40 on the housing 10, defines a pump cavity within which are situated positive-displacement gear pump elements 42. An impeller sleeve shaft 44 is journalled within the bearing opening 46 in the wall 38. It is connected to the hub of the impeller 20. Turbine 22 includes a hub which is splined directly to turbine shaft 48.

The turbine 22 includes an inner shroud 50 and an outer shroud 52 with flow directing blades 54 situated between the shrouds. A clutch piston 56 is located between the shroud 52 and the adjacent wall of the shell 18. The radially outward periphery of the member 56 is formed with a friction surface 58, which selectively engages the cooperating friction surface 60 on the radially outward inner surface of the shell 18.

Piston member 56 is piloted on the hub 62 of the turbine 22. It is subjected to the pressure within the torus circuit of the converter. The region between the piston 56 and the adjacent wall of the shell 18 is in fluid communication with a central opening 64 in the turbine shaft 48. This opening communicates through a radial passage with the annular space 66 between the shaft 48 and the stationary sleeve shaft 34.

A flow return passage extending from the torus circuit of the converter is defined in part by the annular space 68 between the sleeve shaft 34 and the sleeve shaft 44. This space is in fluid communication with a flow return passage schematically illustrated at 70. A torus feed passage, shown schematically at 72, is in fluid communication with annular passage 66 and passage 64.

The outer margin of the piston member 56 is connected resiliently with the turbine outer shroud 52, suitable springs 74 being provided for this purpose.

When fluid is admitted to the passage 72, it is transferred through the opening 64 and radially outwardly through the annular space between the piston 56 and the shell 18. It then passes radially outwardly across the friction surfaces 58 and 60 into the region of the torus circuit of the converter. The return flow from the torus circuit of the converter during operation of the converter in the coupling range and in the converter range passes through the passage 68 and through the communicating passage 70. When the flow is reversed—that is, when passage 70 acts as a feed passage and passage 72 is subjected to a lower pressure—the static pressure within the torus circuit is effective to shift the piston 56 so that the friction surfaces 58 and 60 are drivably engaged. This establishes a direct-drive connection through the lock-up clutch structure between the crankshaft 14 and the turbine shaft 48.

For a description of a converter of this kind and a control system for changing the direction of fluid flow through the converter, reference may be had to U.S. Pat. No. 3,252,352 (N. T. General et al.) which is assigned to the assignee of my instant invention.

The transmission gearing comprises a double planetary gear unit 76 having a first sun gear 78 and a second sun gear 80. It includes also a ring gear 82, a set of first planet pinions 84 and a set of planet pinions 86. The pinions 84 and 86 are journalled rotatably on a common carrier 88 and they are situated in meshing engagement with each other. Pinions 84 mesh also with sun gear 80 and ring gear 82. Pinions 86 mesh with sun gear 78. Sun gear 78 is connected drivably to central shaft 90.

Ring gear 82 is connected drivably to power output shaft 92.

Central torque delivery shaft 90 is adapted to be connected drivably to turbine shaft 48 through a selectively-engageable, forward-drive clutch identified generally at 94. This comprises a clutch drum 96 which defines an annular cylinder 98 within which is positioned an annular piston 100. Cylinder 98 and piston 100 cooperate to define an annular pressure chamber which is in fluid communication with the clutch feed passage 102. Drum 96 is drivably connected to the turbine shaft 48.

Sun gear 80 may be connected drivably to the clutch drum 96 through a reverse-and-high, selectively-engageable, friction clutch 104. This clutch includes a clutch drum 106 in which is formed an annular cylinder 108. An annular piston 110 situated in the cylinder 108 defines a pressure chamber which is supplied with fluid pressure through a feed passage 112. Friction brake band 114 surrounds the drum 106. It may be applied during intermediate speed ratio operation to establish a torque reaction point, at which time the clutch 104 is released.

Carrier 88 is adapted to be anchored to the transmission housing 10 through an overrunning brake 116. This accommodates torque reaction in one direction only. If torque reaction in both directions is desired, brake 118 can be applied to the drum portion 120 of the carrier 88.

During forward drive operation the friction clutch 94 is supplied regardless of the transmission ratio. During acceleration from a standing start, the turbine torque that is developed is delivered through shaft 48 and through the clutch 94 to the sun gear 78. Planetary pinions 86, which are driven by the sun gear 78, drive pinions 80 which in turn drive the ring gear 82 in the same direction of rotation as the rotation of sun gear 78. The carrier 88, which is anchored against the transmission housing by the brake 116, serves as a reaction point.

To establish an intermediate speed ratio condition, it merely is necessary to apply the intermediate speed ratio brake band 114. This anchors the sun gear 80 and the overrunning brake 116 begins to freewheel. The sun gear 80 now acts as a reaction element rather than the carrier.

When the brake band 114 is released and the clutch 104 is applied, the planetary gear system is locked up for rotation in unison as the ring gear 82 and the power output shaft 92 are driven by the turbine shaft 48 with a 1:1 ratio.

Reverse is obtained by engaging brake band 118, releasing clutch 94 and applying clutch 104. Turbine torque then is delivered from shaft 48 through the clutch drum 96 and through the engaged clutch 104 to the sun gear 80. Carrier 88 again acts as a reaction member, and the ring gear 82, with the sun gear 80 acting as a power input member, is driven in a reverse direction.

A lock-up condition may be obtained after the transmission is conditioned for high speed ratio operation by engageing the lock-up clutch friction surfaces 58 and 60. This is done by reversing the direction of the fluid flow through the torus circuit of the converter so that passage 64 acts as a flow return passage and passage 68 acts as a fluid feed passage. While the piston member 56 engages the impeller shell, a direct-driving connection is established between the crankshaft 14 and the turbine shaft 48.

Figure 2:
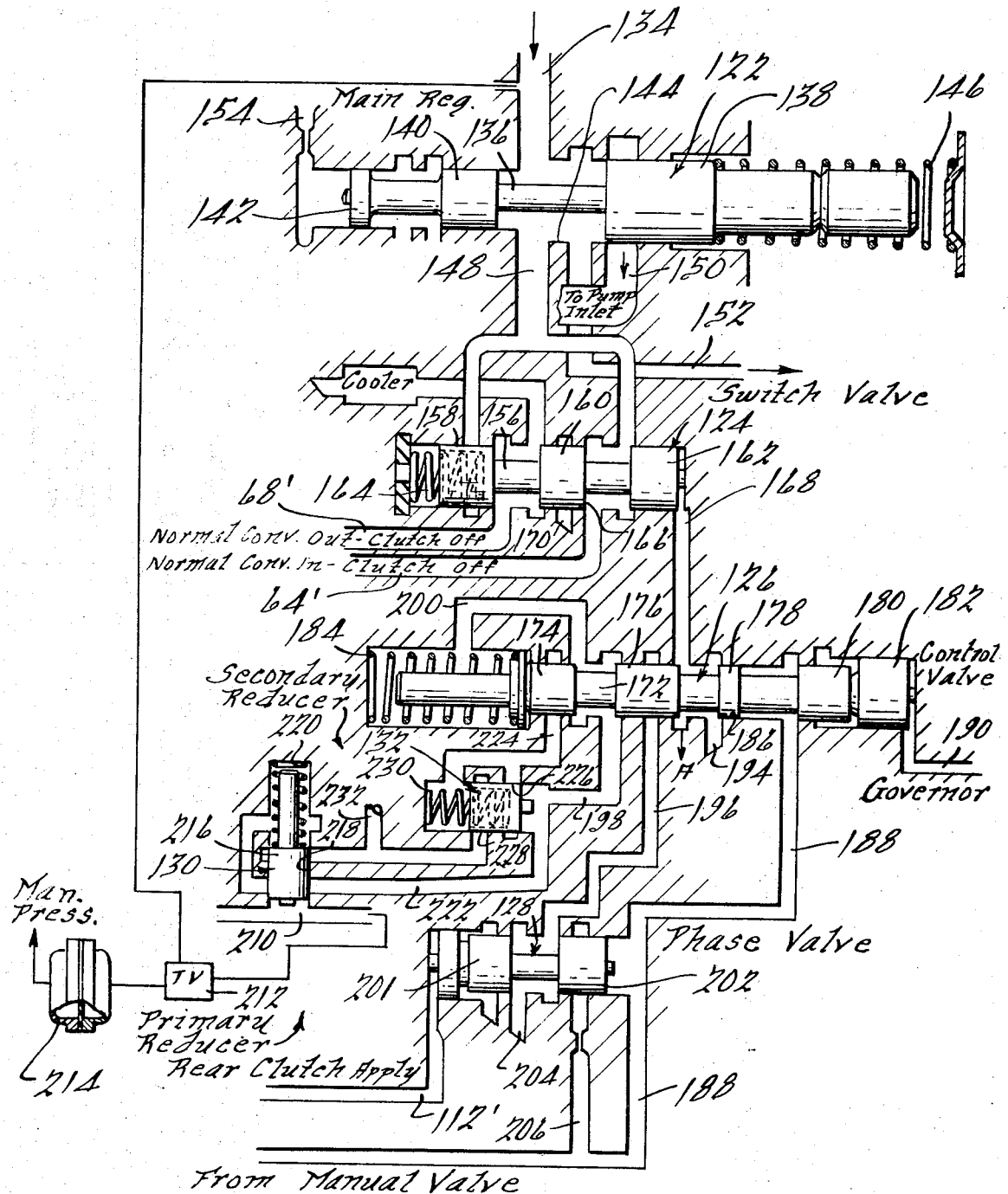
FIG. 2 shows in schematic form the improvements in the valve system of my invention.

The valve system for controlling the actuation and release of the lock-up clutch, shown in part at 56, is shown in FIG. 2. It includes a pressure regulator valve 122, a switch valve 124, a shift control valve 126, a phase valve 128, a primary throttle pressure reducer valve 130 and a secondary throttle pressure reducer valve 132. Control valve 122 receives pressurized fluid from the engine driven positive displacement pump shown in FIG. 1 at 42. The feed passage for this fluid is identified by reference character 134.

Regulator valve 122 comprises a valve spool 136 having spaced lands 138, 140 and 142. These register with internal valve lands formed in a valve chamber 144. A valve spring 146 situated in the valve body urges normally the valve element 136 in a left-hand direction.

The lands 140 and 138 are formed with a differential area which is subjected to the pressure in passage 134 and in outlet passage 148. Land 138 controls the degree of communication between passage 148 and a low-pressure, flow-return passage 150 which communicates with the chamber 144. A rear lube passage 152 communicates with the chamber 144 adjacent the passage 150. The flow through the passage 152 is controlled by valve land 138.

When the vehicle engine is idling, land 138 blocks passage 150 thereby permitting the valve to provide lubricant upon a pressure build-up on the outlet side of the pump. Land 142 is pressurized with a compensator pressure, which is supplied to the left-hand side of the chamber 144 through passage 154. This compensator pressure is sensitive to engine torque demand so that upon an increase in torque demand, or upon an increase in the pressure in the engine intake manifold, the pressure acting on the land 142 in a right-hand direction is decreased. This force opposes the force of spring 146. Therefore, upon a decrease in that force, the magnitude of the regulated pressure is increased.

Switch valve 124 comprises a spool 156 with three spaced valve lands 158, 160 and 162. This spool is urged normally in a right-hand direction by valve spring 164. This spool is situated in a valve chamber 166 which has internal valve lands that register with the external valve lands of the valve spool 166. A signal pressure passage 168 communicates with the right-hand side of the chamber 166. When a signal is present in the passage 168, the spool 156 is shifted against the force of spring 164 in a left-hand direction. This then establishes a connection between the converter feed passage 64' and an exhaust port 170. The converter feed passage 64' shown in FIG. 2 corresponds to feed passage 64 in FIG. 1. When the valve spool 156 is shifted in a left-hand direction, communication is interrupted between passage 64' and passage 148.

Land 158 blocks communication with chamber 166 when the spool is shifted to the position shown in FIG. 2. When it is shifted in a left-hand direction, however, passage 148 communicates through the switch valve with the converter flow return passage 68' which communicates with the previously described passage 68 of FIG. 1.

Distribution of pressure to passage 168 is controlled by the control valve 126. This comprises a valve spool 172 with spaced valve lands 174, 176, 178, 180 and 182. Spool 172 is urged in a right-hand direction by valve spring 184. Governor pressure acts on the right-hand end of valve land 182 thereby tending normally to urge the spool 172 against the force of spring 184. The valve spool 172 is situated in a valve chamber 186. Control pressure is distributed to the chamber 186 through a passage 188 which is opened and closed by valve land 180. Passage 188 communicates with the manual valve which in turn is pressurized by the pressure source. Upon positioning the manual valve to a forward drive position, passage 188 becomes pressurized.

The right-hand side of valve land 182 is subjected to governor pressure which is distributed to it through passage 190. This governor pressure is obtained from the governor pressure valve assembly connected directly to the power output shaft 92 as indicated schematically at 192 in FIG. 1. Passage 168 communicates through the control valve with an exhaust port 194 when the valve spool 172 is positioned as shown. When it is shifted in a left-hand direction upon an increase in the governor pressure, land 178 blocks port 194 and passage 168 is brought into fluid communication with passage 196 which extends to the phase valve 128.

When the valve spool 172 is positioned as shown, communication is established between throttle pressure passage 198 and feedback throttle pressure passage 200, the latter extending to the spring chamber behind the land 174. The line pressure in passage 188 acts on the differential area of lands 178 and 180 thereby tending to supplement the force of the spring 184 when the valve spool is positioned as shown. This area is exhausted upon shifting movement in a left-hand direction, however, thereby introducing a hysteresis effect in the control valve which will result in a downshift at a different speed than that at which the upshift occurred. The diameter of land 180 is slightly larger than the diameter of land 178.

Phase valve 128 comprises a pair of spaced valve lands 201 and 202. The left-hand end of the valve 128 is in communication with signal passage 112' which communicates with the rear clutch feed passage 112 shown in FIG. 1. The right-hand side of the valve 128 communicates with the pressure in passage 188 extending from the manual valve. Passage 196 communicates with exhaust port 204 when the valve 128 is shifted in the position shown in FIG. 2. The left-hand side of the land 201 is formed with a relatively large diameter. Thus when the rear clutch is applied, the valve 128 will be shifted in a right-hand direction thereby interrupting communication between passage 196 and the exhaust port 204 and establishing communication between passage 196 and control pressure passage 206, which communicates with the passage 188.

Throttle valve pressure is distributed to passage 210. A signal source is schematically illustrated at 212 in FIG. 2. The valve 212 is actuated by the engine manifold pressure sensitive servo 214. When the manifold pressure in the engine increases, the output pressure signal in passage 210 increases. Valve 212 may be supplied from a high pressure line, such as the line 134.

To establish a proper shift delay during acceleration, pasage 210 communicates with the feedback passage 200 on the control valve through the primary reducer valve 130. This comprises a single diameter valve element 216 slidably situated in the valve wall 218. The valve spring 220 acts against the opposing influence of the throttle pressure in passage 218.

When the minimum throttle pressure is achieved, passage 210 is brought into fluid communication with passage 222, which extends in turn to the passage 200 through the control valve chamber 186. When the control valve spool 172 is positioned as shown, passage 200 is in communication with passage 198 through the control valve. Land 176, however, blocks passage 198 when the spool 172 is shifted in a left-hand direction. At that time passage 200 is brought into communication with secondary reducer output pressure passage 224 as land 174 uncovers the passage 224.

Passage 224 communicates with valve bore 226 within which is situated a secondary reducer valve element 228. This valve element is spring biased in a right-hand direction by valve spring 230. When the minimum pressure in passage 222 is achieved, passage 224 is uncovered by the valve element 228. The pressure in passage 224 is fed back to the left-hand side of the valve element 228 through a cross-over passage. Thus the valve element 228 is capable of modulating the pressure in passage 222 to produce a resultant output pressure in passage 224 which, when the valve spool 172 is in an upshift position, will be distributed to the spring chamber. Spring 184 thereby introduces a shift delay.

The regulated pressure provided by valve 130 also is distributed to the upper end of the valve element 216 to permit it to act as a modulator valve element.

When the valve spool 172 is in the upshifted position, a kick-down pressure signal may be introduced to the left-hand side of the valve element 228 through kick-down pressure passage 232. This signal then is distributed directly through cross-over passage 200 to the spring chamber for spring 184, thereby causing the control valve 126 to move to the downshift position.

Figure 4:
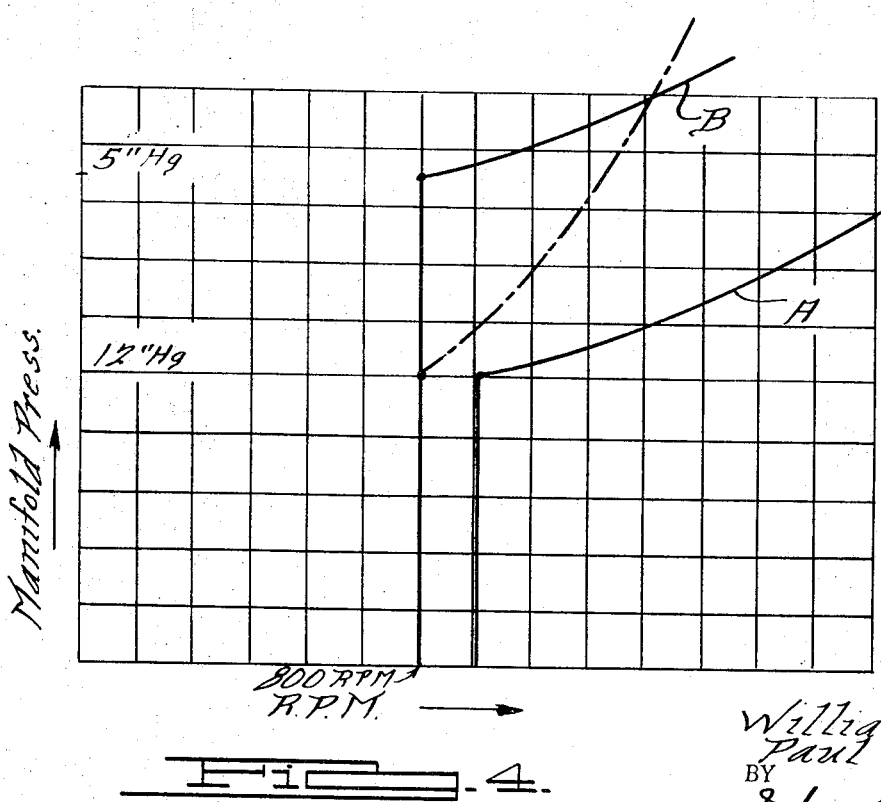
FIG. 4 shows a chart of the variation in the upshift and downshift points for the transmission mechanism FIG. 1 for any given engine intake manifold pressure.

The shift pattern that is established for the shift points during an upshift and during a downshift is illustrated in FIG. 4. During acceleration the transmission will remain in a high speed ratio until an engine speed of approximately 1000 r.p.m. is reached and the manifold vacuum is about 12 inches of mercury. If the engine vacuum should exceed 12" of mercury, the upshift will occur from the high speed ratio to a lock-up condition at successively increasing speeds. This is represented by the curved portion A in FIG. 4. This shift delay, of course, is introduced by reason of the output pressure of the primary reducer valve element 130 in passage 222. It is this pressure distributed to the left-hand end of the control valve 126 that delays the upshifting tendencies resulting from an increase in the governor pressure signal in passage 190 as acceleration continues.

When an upshift does occur, the valve element 126 finally will shift in a left-hand direction. At that time passage 198 becomes blocked. There is no longer a shift delay feature introduced until the pressure in passage 222 is sufficient to overcome the force of the secondary reduced valve spring 230. This will occur, for example, when the manifold pressure in the engine is approximately 5 inches of mercury at the downshift point. If the minimum pressure should increase from that value, the downshift will occur at progressively increasing speeds as represented by the curved portion B in FIG. 4.

Curved portion B is separated vertically a substantial distance from curve portion A. This distance represents a variation in engine manifold pressure that is greater than 6 inches of mercury, which is the tolerance that normally is experienced for variations in manifold pressure when the transmission mechanism is in a lock-up direct drive condition. Thus a downshift will not occur inadvertently when it is not desired upon the fluctuation in the manifold pressure.

The speed at which the downshift point occurs depends upon the calibration of the secondary reducer valve element. In this instance the secondary reducer valve spring is designed to produce an output pressure in passage 224 that will result in a downshift point less than the upshift point. The downshift point may occur at about 800 r.p.m. engine speed. As indicated, the corresponding manifold pressure at that point is substantially higher than the manifold pressure that existed at the upshift point.

The phase valve will prevent the distribution of the control signal to passage 196 under all conditions except a direct drive condition at which time the direct drive clutch 104 is applied. When it is applied, passage 112' is pressurized thereby causing the valve 128 to shift in a right-hand direction. This assures that the lock-up condition will occur only after a direct drive condition is achieved.

The switch valve assembly serves to reverse the direction of flow through the torus circuit of the converter. When passage 64 acts as a fluid feed passage, the clutch is disengaged. At that time the passage 148 is free to supply the converter with fluid through the switch valve. When the control valve signal is in a lock-up condition, however, the functions of the passages 64' and 68' are interchanged so that the latter acts as a feed passage as passage 64' is exhausted.

Figure 3:
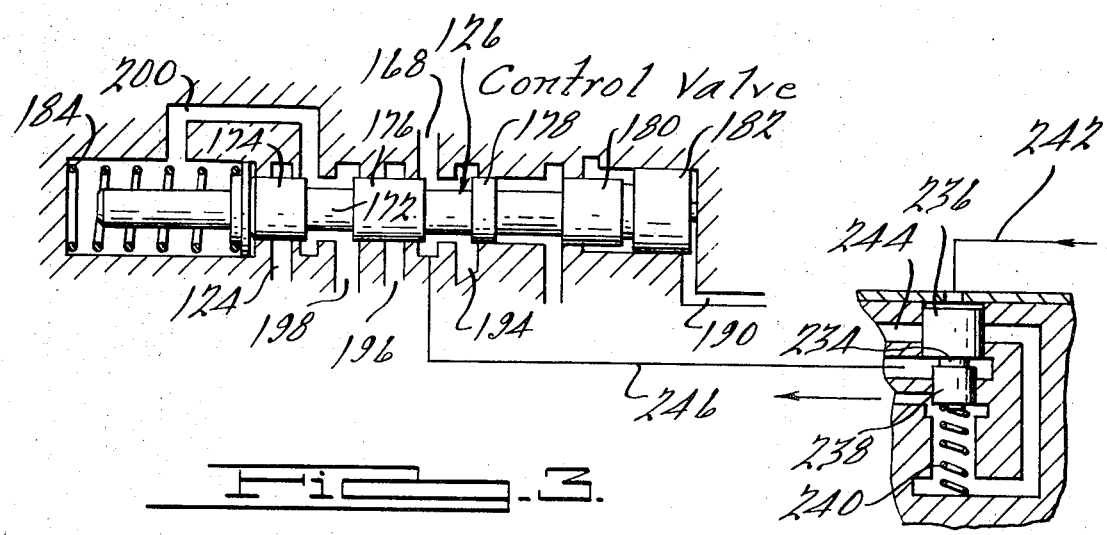
FIG. 3 is an alternate construction of a double function throttle pressure reducer valve for use in the circuit of FIG. 2.

In the embodiment of FIG. 3, which is a variation of the design shown in FIG. 2, the functions of the primary reducer valve and the secondary reducer valve spool 234 having spaced valve lands 236 and 238, the diameter of land 238 being less than the diameter of land 236. Valve spring 240 urges the valve spool 234 in an upward direction. Throttle pressure which corresponds to the pressure in passage 210 in the FIG. 2 embodiment is distributed to the upper end of the valve land 236 through a throttle pressure feed passage 242. The output pressure for the valve of FIG. 3 is distributed through passage 244. Passage 246 communicates with the differential area of lands 236 and 238. When the valve element 234 is in the position shown, regulated pressure in passage 244 is distributed to the spring chamber for the control valve which would correspond to the valve 126 of FIG. 2. As soon as an upshift occurs, passage 246, which previously was exhausted, becomes pressurized with the pressure in passage 168. This introduces an added force that supplements the action of the spring 240. Thus a higher input pressure in passage 242 is required to produce any given effective output pressure in passage 244. The shift delay then is modified after an upshift into the lock-up condition occurs. This again establishes a different downshift point than the point at which the upshift occurred, as indicated in FIG. 4.

Having described preferred forms of our invention, what we claim and desire to secure by U.S. Letters Patent is:

1. In a multpile ratio power transmission mechansim having gear elements capable of establishing plural torque delivery paths between a driving member and a driven member, fluid pressure operated servo means for controlling the relative motion of said gear elements, a fluid pressure source, conduit structure interconnecting said servos and said pressure source, control valve means in fluid communication with said conduit structure for controlling selectively distribution of pressure to at least one of said servos to initiate speed ratio changes, said control valve means having an upshift position and a downshift position, a source of a first pressure signal that is proportional in magnitude to the engine torque requirements, a source of second pressure signal that is proportional in magnitude to the driven speed of said driven member, a connection between said control valve means and said speed signal source whereby an upshifting tendency is imposed on said control valve means, a signal passage having first and second portions connecting said torque signal source and said control valve means whereby the latter is subjected to a downshifting tendency, first and second throttle reduced valve means situated respectively in said first and second signal passage portions for modulating said torque signal, one passage portion being blocked by said control valve means when the latter assumes one position and opened when it assumes another position, whereby the effective modulated torque signal acting on said control valve means is changed upon an upshift of said control valve means, thereby causing a different shift delay characteristic on upshifts than on downshifts.

2. The combination as set forth in claim 1 wherein said first reduced valve means defines in part a first fluid connection between said control valve means and said torque signal source, said second reducer valve means being situated in parallel relationship with respect to said first reduced valve means and defining in part a secondary fluid flow path between said torque signal source and control valve means, said secondary path being blocked by said control valve means when it is in a downshift position, said first connection being blocked by said control valve means when in an upshifted position.

3. In a multiple ratio power transmission mechanism having gear elements capable of establishing plural torque delivery paths between a driving member and a driven member, fluid pressure operated servo means for controlling the relative motion of said gear elements, a fluid pressure source, conduit structure interconnecting said servos and said pressure source, control valve means in fluid communication with said conduit structure for controlling selectively distribution of pressure to at least one of said servos to initiate speed ratio changes, said control valve means having an upshift position and a downshift position, a source of a first pressure signal that is proportional in magnitude to the engine torque requirements, a source of second pressure signal that is proportional in magnitude to the driven speed of said driven member, a connection between said control valve means and said speed signal source whereby an upshifting tendency is imposed on said control valve means, a signal passage having first and second portions connecting said torque signal source and said control valve means whereby the latter is subjected to a downshifting tendency, a throttle reducer valve means comprising a valve element situated in said signal passage and partly defining a connection between said torque signal source and a first control area on said control valve means, the output pressure of said reducer valve means thereby establishing a shift delay signal, a second control area on said reducer valve means, part of said conduit structure defining a fluid connection between said second control area and said control valve means whereby the latter controls the transfer of a signal to the former to change the modulating action of said reducer valve means following an upshift of said control valve means thereby producing a different shift point for ratio upshifts than for ratio downshifts.

4. The combination as set forth in claim 1 wherein said one of the said servos is a fluid pressure operated friction clutch means for establishing a direct connection between said driving member and said driven member, said control valve means being disposed in said conduit structure in fluid communication with said friction clutch means, said control valve means including a movable valve element adapted to establish and disestablish a fluid connection between said pressure source and said clutch means, said signal passage portions defining two pressure distribution paths, said valve element alternately opening and closing one of said paths upon movement thereof, whereby said clutch means becomes engaged during acceleration at a higher speed for any given torque than the speed at which said clutch means becomes disengaged for any given torque during a downshift of said control valve means.

5. The combination as set forth in claim 2 wherein said one of said servos is a fluid pressure operated friction clutch means for establishing a direct connection between said driving member and said driven member, said control valve means being disposed in said conduit structure, said control valve means including a movable valve element adapted to establish and disestablish a fluid connection between said pressure source and said clutch means, said valve element alternately opening and closing one of said paths upon movement thereof whereby said clutch means becomes engaged during acceleration at a higher speed for any given torque than the speed at which said clutch means becomes disengaged for any given torque during a downshift of said control valve means.

6. The combination as set forth in claim 3 wherein said one of said servos is a fluid pressure operated friction clutch means for establishing a direct connection between said driving member and said driven member of said mechanism, said control valve means being disposed in said conduit structure, said control valve means including a movable valve element adapted to establish and disestablish a fluid connection between said pressure source and said clutch means, the portions of said signal passage defines two pressure distribution paths, said valve element alternately opening and closing one of said paths upon movement thereof whereby said clutch means becomes engaged during acceleration at a higher speed for any given torque than the speed at which said clutch means becomes disengaged for any given torque during a downshift of said control valve means.

References Cited
UNITED STATES PATENTS

| | | | |
|---|---|---|---|
| 2,875,643 | 3/1959 | Kelley | 74—868 |
| 3,077,122 | 2/1963 | Olsen | 74—869 X |
| 3,095,755 | 7/1963 | Duffy | 74—869 X |
| 3,117,464 | 1/1964 | Ivey | 74—869 |
| 3,239,037 | 3/1966 | Croswhite et al. | 192—3.3 |
| 3,327,554 | 6/1967 | Searles | 74—869 |
| 3,362,261 | 1/1968 | Snyder et al. | 74—864 |
| 3,398,607 | 8/1968 | Chana | 74—864 |
| 3,401,581 | 9/1968 | Chana | 74—864 |
| 3,438,285 | 4/1969 | Hanzi et al. | 74—869 |

MARK NEWMAN, Primary Examiner

T. C. PERRY, Assistant Examiner

U.S. Cl. X.R.

74—868; 192—3.3